United States Patent
Chang et al.

(10) Patent No.: US 7,158,358 B2
(45) Date of Patent: Jan. 2, 2007

(54) PDA WITH BUILT-IN VOLTAGE PROTECTION

(75) Inventors: Wen-Fu Chang, Taipei County (TW); Chien-Ju Lee, Yunlin County (TW)

(73) Assignee: Inventec Appliances Corporation, Taipei Hsieng (TW)

( * ) Notice: Subject to any disclaimer, the term of this patent is extended or adjusted under 35 U.S.C. 154(b) by 418 days.

(21) Appl. No.: 10/729,985

(22) Filed: Dec. 9, 2003

(65) Prior Publication Data

US 2004/0114292 A1  Jun. 17, 2004

(51) Int. Cl.
    *H02H 3/20* (2006.01)
(52) U.S. Cl. ...................................... 361/90
(58) Field of Classification Search ................ 361/90; 307/130
    See application file for complete search history.

(56) References Cited

U.S. PATENT DOCUMENTS

| | | | | |
|---|---|---|---|---|
| 3,428,864 A * | 2/1969 | Redmond et al. | ............. | 361/90 |
| 3,657,603 A * | 4/1972 | Adams | ......................... | 361/56 |
| 4,368,499 A * | 1/1983 | Stifter | ......................... | 361/90 |
| 4,999,730 A * | 3/1991 | Pickard | ....................... | 361/59 |
| 5,350,949 A * | 9/1994 | Yazi | ........................... | 307/150 |
| 6,301,131 B1 * | 10/2001 | Yoshida | ...................... | 363/44 |
| 6,331,763 B1 * | 12/2001 | Thomas et al. | ............. | 320/136 |
| 6,804,100 B1 * | 10/2004 | Astala | ....................... | 361/93.2 |

\* cited by examiner

*Primary Examiner*—Brian Sircus
*Assistant Examiner*—Boris Benenson
(74) *Attorney, Agent, or Firm*—Birch, Stewart, Kolasch & Birch, LLP

(57) ABSTRACT

A present invention provides a PDA with built-in voltage protection, comprising a main device, a socket, and a voltage protection module. The main device performs necessary data processing. The socket connects to an adapter. The voltage protection module is coupled between the main device and the socket, wherein the voltage protection module receives an input voltage from the adapter and allowing the input voltage to be applied to the main device when the input voltage is between a preset maximum voltage and a preset minimum voltage.

7 Claims, 3 Drawing Sheets

PDA WITH BUILT-IN VOLTAGE PROTECTION

This nonprovisional application claims priority under 35 U.S.C. §119(a) on patent application Ser. No. 91136303 filed in TAIWAN on Dec. 16, 2002, the entire contents of which are hereby incorporated by reference.

BACKGROUND OF THE INVENTION

1. Field of the Invention

The present invention relates to a voltage protection device. In particular, the present invention relates to a voltage protection device built into a PDA (personal digital assistant) device to limit voltage input.

2. Description of the Related Art

In recent years, hand-held electronic devices have become increasingly popular. Typically, various hand-held electronic devices are powered by their respective adapters.

If a PDA is subjected to excessive voltage, the PDA can be damaged. Additionally, with prolonged use, an adapter may provide excessive or inadequate voltage potentially damaging the PDA.

SUMMARY OF THE INVENTION

It is an object of the present invention to provide voltage control. The voltage protection device limits an input voltage within a preset range.

It is another object of the present invention to provide a PDA with a built-in voltage protection device.

To achieve the above-mentioned object of the invention provide a voltage protection device is provided. The voltage protection device comprises, a first limiting device, a first switch device, a second limiting device and a second switch device. The first limiting device compares an input voltage with preset maximum voltage, wherein the first limiting device outputs a first enable signal when the input voltage is less than the preset maximum voltage. The first switch device has a first input terminal coupled to the input voltage, a first control terminal, and a first output terminal, wherein the first switch device outputs the input voltage when the first control terminal receives the first enable signal. The second limiting device is coupled to the first output terminal to compare the input voltage from the first switch device with a preset minimum voltage, to output a second enable signal when the input voltage is greater than the preset minimum voltage. The second switch device has a second input terminal coupled to the first output terminal, a second control terminal, and a second output terminal, wherein the second switch device outputs the input voltage when the second control terminal receives the second enable signal.

Another object of the present invention is to provide a PDA. The PDA includes a main device, a socket, and a voltage protection module. The main device performs necessary data processing. The socket connects to an adapter. The voltage protection module is coupled between the main device and the socket, for receiving an input voltage from the adapter and allowing the input voltage to be applied to the main device when the input voltage is between a preset maximum voltage and a preset minimum voltage.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE INVENTION

Figure 1:
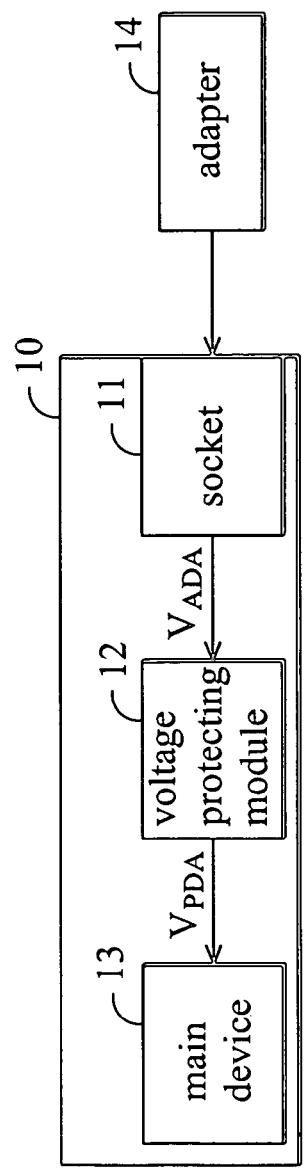
FIG. 1 shows a PDA with built-in voltage protection.

FIG. 1 shows a PDA with built-in voltage protection. An adapter 14 is connected to a PDA 10. The PDA 10 comprises a socket 11, a voltage protection module 12 and a main device 13. The main device 13 performs necessary data processing. The socket 11 connects to the adapter 14. The voltage protection module 12 receives an adapter voltage $V_{ADA}$ from the adapter 14. The voltage protection module 12 outputs a PDA voltage $V_{PDA}$ to the main device 13 when the input voltage $V_{ADA}$ is between a preset maximum voltage and a preset minimum voltage.

Figure 2:
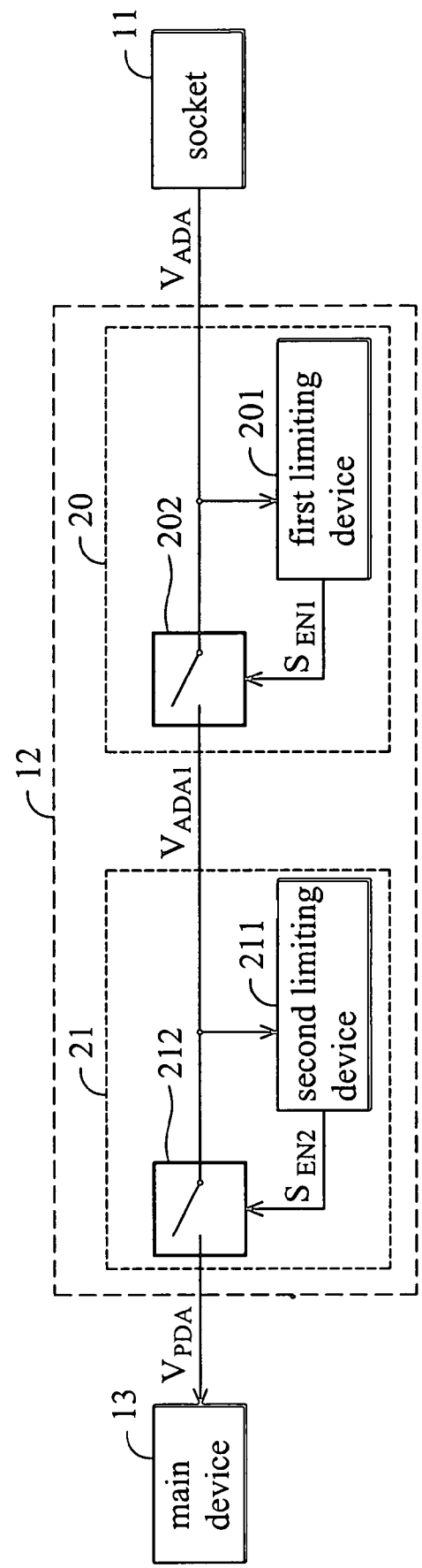
FIG. 2 shows the block diagram according to a preferred embodiment of the present invention.

FIG. 2 shows the block diagram of the present invention. The voltage protection module 12 includes a first control module 20 and a second control module 21. The first control module 20 has a first input terminal and a first output terminal, the first input terminal is coupled to the socket 11 to receive the adapter voltage $V_{ADA}$ from the adapter 14, the first output terminal outputs the first voltage $V_{ADA1}$ when the adapter voltage $V_{ADA}$ is less than the preset maximum.

The second control module 21 has a second input terminal and a second output terminal. The second input terminal receives the first voltage $V_{ADA1}$ from the first output terminal. The second output terminal outputs the PDA voltage $V_{PDA}$ to the main device 13 when the first voltage $V_{ADA1}$ is greater than the preset minimum.

The first control module 20 comprises a first limiting device 201 and a first switch device 202. The first limiting device 201 receives the adapter voltage $V_{ADA}$. The first limiting device 201 outputs a first enable signal $S_{EN1}$ when the adapter voltage $V_{ADA}$ is less than the preset maximum. The first switch device 202 receives the adapter voltage $V_{ADA}$. Upon receiving the first enable signal $S_{EN1}$, the first switch device 202 outputs the received adapter voltage $V_{ADA}$ as a first voltage $V_{ADA1}$. Therefore, the first voltage $V_{ADA1}$ is equal to the adapter voltage $V_{ADA}$.

The second control module 21 comprises a second limiting device 211 and a second switch device 212. The second limiting device 211 receives the first voltage $V_{ADA1}$ from the first control module 20. When the first voltage $V_{ADA1}$ is greater than the preset minimum, the second limiting device 211 outputs a second enable signal $S_{EN2}$.

Figure 3:
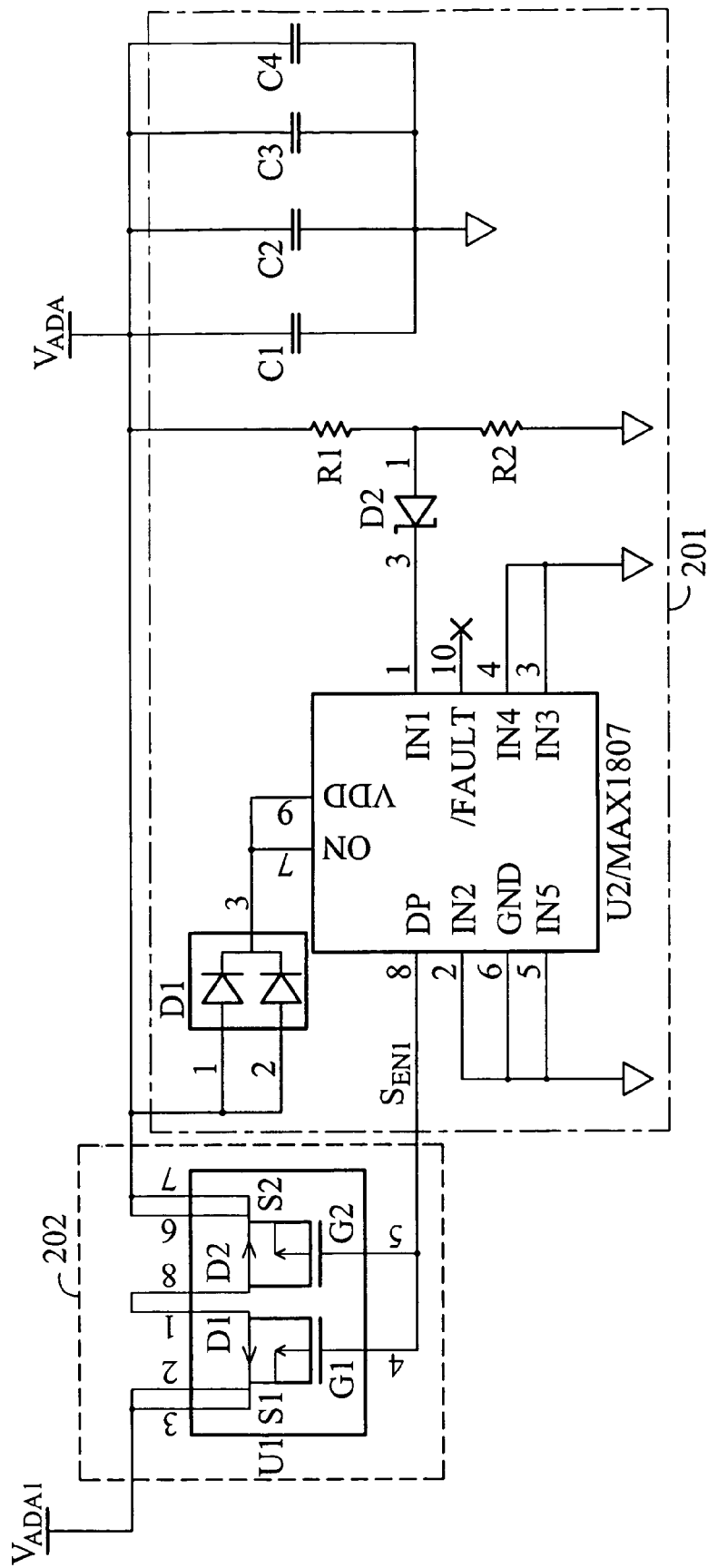
FIG. 3 is the first control module 20 internal circuit block diagram.
Figure 4:
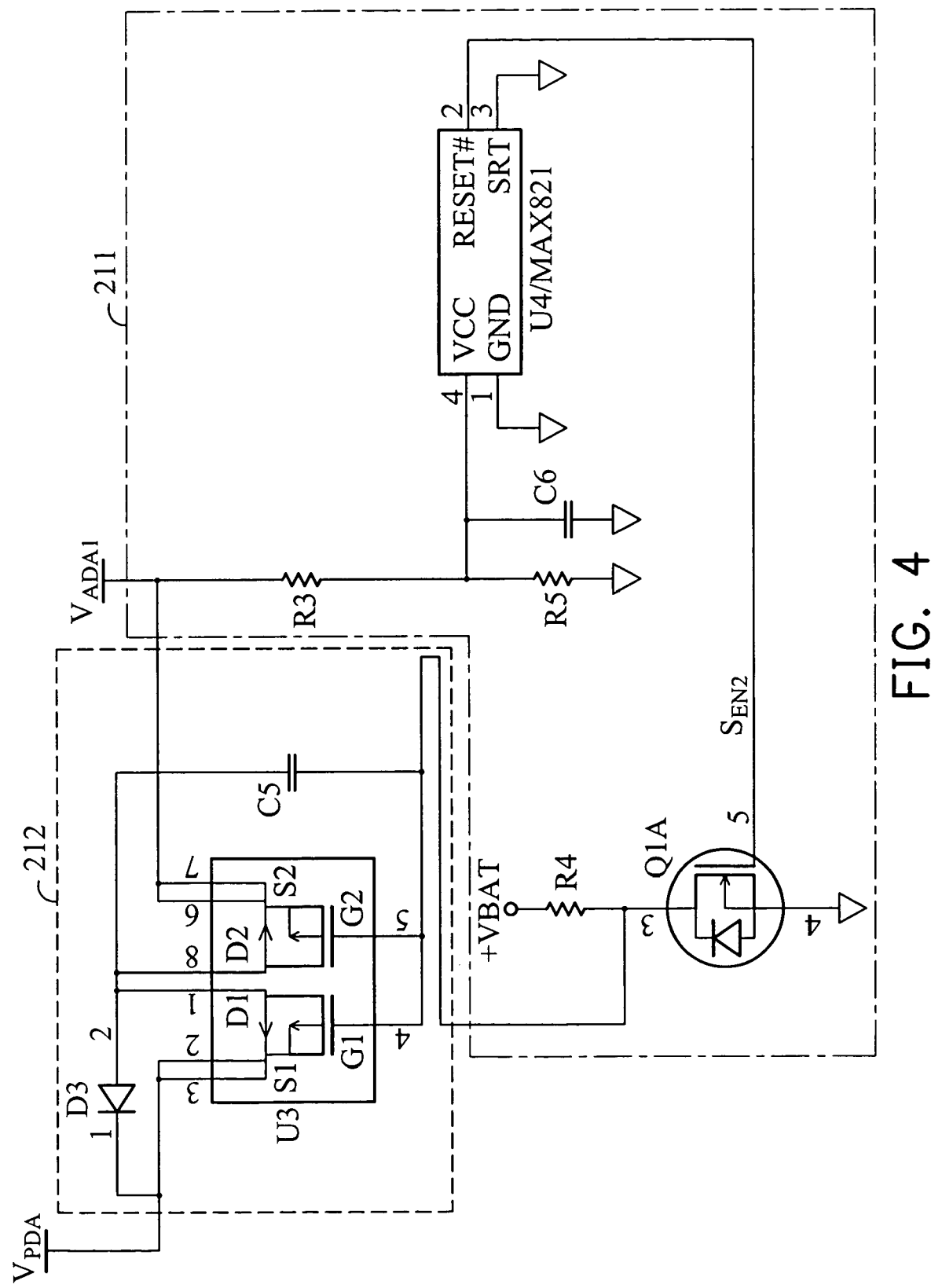
FIG. 4 is the second control module 21 internal circuit block diagram.

FIGS. 3 and 4 show the circuit of the present invention. FIG. 3 is a circuit of the first control module 20. The capacitors C1~C4 cancel noise from the adapter voltage $V_{ADA}$. The diodes D1 and D2 provide a current limiting function. The resistors R1 and R2 serve as a voltage divider. A voltage limiting IC MAX1807 determines whether or not the adapter voltage $V_{ADA}$ is less than the preset maximum.

If the adapter voltage $V_{ADA}$ is less than the preset maximum, the voltage limiting IC MAX1807 outputs the first enable signal $S_{EN1}$. A switch device U1 outputs the first voltage $V_{ADA1}$ when the switch device U1 receives the first enable signal $S_{EN1}$. The first voltage $V_{ADA1}$ is the same as the adapter voltage $V_{ADA}$.

FIG. 4 is a circuit of the second control module 21. The voltage limiting IC MAX821 determines whether or not the first voltage $V_{ADA1}$ is greater than the preset minimum.

The limit voltage IC MAX821 outputs a second enable signal $S_{EN2}$ to a transistor Q1A when the first voltage $V_{ADA1}$ is greater than the preset minimum. A switch device U3 outputs the PDA voltage $V_{PDA}$ to the main device 13 when the switch device U3 receives the second enable signal $S_{EN2}$. The PDA voltage $V_{PDA}$ is equal to the first voltage $V_{ADA1}$.

Accordingly, advantages of the present invention are described in the following.

The present invention detects the range of the input voltage (adapter voltage $V_{ADA}$) to prevent a higher voltage from being input to the PDA. Additionally the PDA of the present invention, user is able to accept any adapter. If the adapter supplies an out of range voltage, the voltage protection device cuts off power from the adapter. Finally, when the adapter is used too frequently, the present invention separates the error voltage according to different voltage specifications.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A PDA with built-in voltage protection, comprising:
   a main device for data processing;
   a socket for connecting to an adapter;
   a first control module having a first input terminal and a first output terminal, the first input terminal coupled to the socket to receive an input voltage from the adapter, the first output terminal outputting the input voltage when the input voltage is smaller than a preset maximum voltage; and
   a second control module having a second input terminal and a second output terminal, the second input terminal receiving the input voltage from the first output terminal, the second output terminal outputting the input voltage to the main device when the input voltage is greater than a preset minimum voltage.

2. The PDA as claimed in claim 1, wherein the first control module comprises:
   a first limiting device for comparing the input voltage with the preset maximum voltage, wherein the first limiting device outputs a first enable signal when the input voltage is less than the preset maximum voltage; and
   a first switch device having a third input terminal coupled to the input voltage, a first control terminal, and a third output terminal, wherein the first switch device outputs the input voltage when the first control terminal receives the first enable signal.

3. The PDA as claimed in claim 1, wherein the second control module comprises:
   a second limiting device coupled to the third output terminal for comparing the input voltage from the first control module with the preset minimum voltage, to output a second enable signal when the input voltage is greater than the preset minimum voltage; and
   a second switch device having a fourth input terminal coupled to the third output terminal, a second control terminal, and a fourth output terminal, wherein the second switch device outputs the input voltage when the second control terminal receives the second enable signal.

4. A voltage protection module for limiting an input voltage between a preset maximum voltage and a preset minimum voltage, comprising:
   a first control module having a first input terminal and a first output terminal, the first input terminal coupled to the input voltage, the first output terminal outputting the input voltage when the input voltage is less than the preset maximum voltage; and
   a second control module having a second input terminal and a second output terminal, the second input terminal receiving the input voltage from the first output terminal, the second output terminal outputting the input voltage to a PDA when the input voltage is greater than a preset minimum voltage.

5. The voltage protection module as claimed in claim 4, wherein the first control module comprises:
   a first limiting device for comparing the input voltage with the preset maximum voltage, wherein the first limiting device outputs a first enable signal when the input voltage is less than the preset maximum voltage; and
   a first switch device having a third input terminal coupled to the input voltage, a first control terminal, and a third output terminal, wherein the first switch device outputs the input voltage when the first control terminal receives the first enable signal.

6. The voltage protection device as claimed in claim 4, wherein the second control module comprises:
   a second limiting device coupled to the third output terminal for comparing the input voltage from the first control module with the preset minimum voltage, to output a second enable signal when the input voltage is greater than the preset minimum voltage; and
   a second switch device having a fourth input terminal coupled to the third output terminal, a second control terminal, and a fourth output terminal, wherein the second switch device outputs the input voltage when the second control terminal receives the second enable signal.

7. A voltage protection device, comprising:
a first limiting device for comparing an input voltage and a preset maximum voltage, wherein the first limiting outputs a first enable signal when the input voltage is less than the preset maximum voltage;
a first switch device having a first input terminal coupled to the input voltage, a first control terminal, and a first output terminal, wherein the first switch device outputs the input voltage when the first control terminal receives the first enable signal;
a second limiting device coupled to the first output terminal for comparing the input voltage from the first switch device and a preset minimum voltage, to output a second enable signal when the input voltage is greater than the preset minimum voltage; and
a second switch device having a second input terminal coupled to the first output terminal, a second control terminal, and a second output terminal, wherein the second switch device outputs the input voltage when the second control terminal receives the second enable signal.

* * * * *